United States Patent [19]

Musch et al.

[11] Patent Number: 5,278,599
[45] Date of Patent: Jan. 11, 1994

[54] AUTOMATIC SHEET LOADER FOR IMAGING APPARATUS

[75] Inventors: Michael F. Musch, White Bear Township, Ramsey County; Michael J. Carroll, New Brighton, both of Minn.

[73] Assignee: Management Graphics, Inc., Minneapolis, Minn.

[21] Appl. No.: 12,339

[22] Filed: Feb. 2, 1993

[51] Int. Cl.⁵ .......................... G03B 1/18; G03B 7/00; G03B 19/10
[52] U.S. Cl. .................... 354/173.1; 354/2; 354/182
[58] Field of Search .............. 354/2, 4, 174, 212, 354/354, 178, 179, 180, 181, 182

[56] References Cited

U.S. PATENT DOCUMENTS

| | | | |
|---|---|---|---|
| 4,206,989 | 6/1980 | Hahn et al. | 354/182 |
| 4,755,839 | 7/1988 | Pasieka | 354/86 |
| 4,779,112 | 10/1988 | Thor | 354/174 |
| 4,800,405 | 1/1989 | Johnson et al. | 354/86 |

Primary Examiner—Michael L. Gellner
Assistant Examiner—Nicholas J. Tuccillo
Attorney, Agent, or Firm—Barry R. Lipsitz

[57] ABSTRACT

An automatic sheet loader for sheets of photographic film or the like is provided. A first drive assembly is used to drive a sheet of imaging material from a supply toward an imaging station. A second drive assembly, independent of the first drive assembly, drives the sheet of imaging material into the imaging station and subsequently retrieves the sheet from the imaging station. An ejection solenoid is used to eject the sheet from the imaging station for retrieval. During a loading cycle, the first and second drive assemblies are actuated to load the sheet into the imaging station. During a retrieval cycle, the ejection solenoid and second drive means are actuated to retrieve the sheet from the imaging station and drive it into an exposed sheet chamber without loading another sheet into the imaging station. A solenoid actuated light trap is provided between the supply and exposed sheet chambers and the imaging station.

19 Claims, 6 Drawing Sheets

AUTOMATIC SHEET LOADER FOR IMAGING APPARATUS

BACKGROUND OF THE INVENTION

The present invention relates to apparatus for loading and unloading sheets of imaging material (e.g., photographic film) from the imaging portion of an image recorder such as a still camera or film recorder.

One type of photographic apparatus that uses photosensitive film is a film recorder. In a conventional film recorder, a light beam from a cathode ray tube ("CRT") or the like is controlled by a deflection system to scan across a stationary frame of photographic film to expose the film with an image. Typically, the images are generated by a computer for the production of slides, transparencies, photographs or the like. Alternatively, the images can comprise natural images acquired by a scanner or television camera for subsequent processing by a computer.

Known film recorders, such as those sold under the trademarks "SOLITAIRE" and "SAPPHIRE" by Management Graphics, Inc. of Minneapolis, Minn., U.S.A., typically include a light source such as a CRT for producing a beam, a deflection system for scanning the beam across the face of the CRT, a system control and central processor unit ("CPU") for controlling the deflection system, and a camera (i.e., "film transport"). The latter component may include a film transport body, lens, lens mounting assembly, aperture plate, film plate, and film transport mechanism. The film may be provided in rolls or strips, or in individual sheets.

The present invention relates to the automatic feeding of individual sheets of film to the exposure area ("imaging station") of a film recorder or other imaging equipment. The term "large format" refers to cameras that use sheet film, typically four inches in width and five inches in height or larger. Large format cameras offer better quality, less graininess and a much greater range of tonal values than smaller film, such as 35 millimeter film. However, the use of sheet film requires the loading of single sheets, one at a time, into the camera for each exposure and subsequent removal of each sheet before the next sheet of film can be loaded. During this inconvenient process, the sheets of film must be protected from light.

An automatic sheet feeding film holder has been proposed in U.S. Pat. No. 4,779,112. The patented apparatus can be attached to or inserted into a processing area, such as a camera or enlarger, and is capable of holding a stack of sheets of photographic film, both before and after exposure. Sheets are fed one at a time from a supply stack into a processing area, and then retrieved while a new sheet is being loaded. The apparatus disclosed in the patent has various drawbacks. For example, a common input/output drive roller is used to load a new sheet into the processing area while an already exposed sheet is being retrieved from the processing area. As a result, if it is desired to expose fewer than all of the sheets in the supply stack, there is no convenient way to prevent an unexposed sheet from being loaded into the processing area when the last exposed sheet is retrieved therefrom. This may result in the wasting of a sheet of film, if the apparatus is removed from the camera to be taken into a darkroom, in which case the sheet of film currently in the exposure area of the apparatus will be exposed to light and destroyed.

The apparatus disclosed in the aforementioned patent also has a cumbersome structure for allowing a photographer to insert a fresh stack of film sheets in the apparatus and to retrieve a stack of exposed sheets.

It would be advantageous to provide an improved automatic single sheet feeder for photographic apparatus, that overcomes the disadvantages of the prior art. The present invention provides such apparatus.

SUMMARY OF THE INVENTION

In accordance with the present invention, apparatus is provided for automatically loading and unloading sheets of imaging material to and from an imaging station. Supply means hold a stack of sheets of imaging material. Receiving means hold a stack of said sheets after imaging. First drive means are provided for driving a sheet of imaging material from the supply means toward the imaging station during a sheet loading cycle. Second drive means, independent of the first drive means, drive the sheet of imaging material into the imaging station during said sheet loading cycle, and subsequently retrieve the sheet from the imaging station and drive the retrieved sheet into the receiving means during a sheet retrieval cycle. The second drive means include a sheet driving member (e.g., roller) to which the first drive means passes off the sheet during the sheet loading cycle, and an output drive member for driving the sheet into the receiving means during the sheet retrieval cycle. Ejection means are provided for ejecting the sheet from the imaging station to the sheet driving member for retrieval. Control means selectively actuate the first and second drive means to load the sheet into the imaging station, or actuate the ejection means and second drive means to retrieve the sheet from the imaging station and drive the sheet into the receiving means without loading another sheet from the supply means into the imaging station.

In an embodiment where the imaging material is light sensitive, such as photographic film, the apparatus can further comprise a light trap mounted in a path for the sheet between the supply means and the imaging station. Means responsive to the control means open the light trap to allow the sheet to travel through the path when being loaded into the imaging station. The light trap can also extend into an output path between the imaging station and the receiving means. Means responsive to the control means open the light trap to allow the sheet to travel through the output path when being driven into the receiving means. In order to maintain the input and output paths in an open condition while sheets are moving therethrough, the apparatus can be designed to open the light trap prior to the time at which the second drive means are actuated.

In an illustrated embodiment, the supply means and receiving means are housed in a clamshell type housing. The housing has a hinged opening to provide access for filling the supply means with said sheets of imaging material and for emptying exposed sheets from the receiving means.

In a specific embodiment, the first drive means comprise at least one input drive roller mounted adjacent to the supply means and driven by a first motor. The second drive means comprise at least one output drive roller mounted adjacent to the receiving means and driven together with said sheet driving roller by a second motor. The control means actuate the first drive means by turning on the first motor and actuate the second drive means by turning on the second motor.

In one illustrated embodiment, the sheet driving roller, input drive roller and output drive roller are fluted to provide good traction between the roller and the sheets being driven thereby. In an alternate preferred embodiment, at least one of the sheet driving roller, input drive roller and output drive roller provides sheet driving surfaces at opposite outer edges of the roller with a reduced diameter portion between the outer edges that does not contact the sheets as they are driven. Such structure reduces the roller to film contact area and reduces the likelihood that the film will be scratched by the roller.

As noted, the sheets can comprise photographic film. In this case, focus maintaining means are provided in the imaging station for holding the film in a flat position for exposure by a camera. The focus maintaining means can comprise support members mounted in said imaging station at leading and trailing edges of said film. In an illustrated embodiment, the support members comprise an edge support roller for supporting one of said leading and trailing edges and an angled edge support for supporting the other of said leading and trailing edges.

In order to provide control over the independent loading and retrieval of sheets to and from the imaging station, the control means can comprise means for stopping the first drive means after a sheet has been passed off to the sheet driving roller of the second drive means. This feature can also be used to properly stage the next sheet for loading into the imaging station. The means for stopping can include a switch or other sensor actuated by a sheet that has progressed to a point downstream of the sheet driving roller.

In a preferred embodiment, the control means are responsive to signals from a camera (e.g., film recorder) for initiating the sheet loading and sheet retrieval cycles. The camera signals can automatically initiate said sheet loading and sheet retrieval cycles without operator intervention.

DETAILED DESCRIPTION OF THE PREFERRED EMBODIMENT

The present invention provides apparatus for automatically loading and unloading sheets of imaging material to and from an imaging station. In the embodiment disclosed, sheets of photographic film are loaded from a stack into an exposure area, and then retrieved from the exposure area for storage in an exposed film chamber. It should be appreciated that other types of imaging material that operate using xerographic, magnetic, thermal or other means can also be loaded and unloaded in accordance with the present invention.

Figure 1:
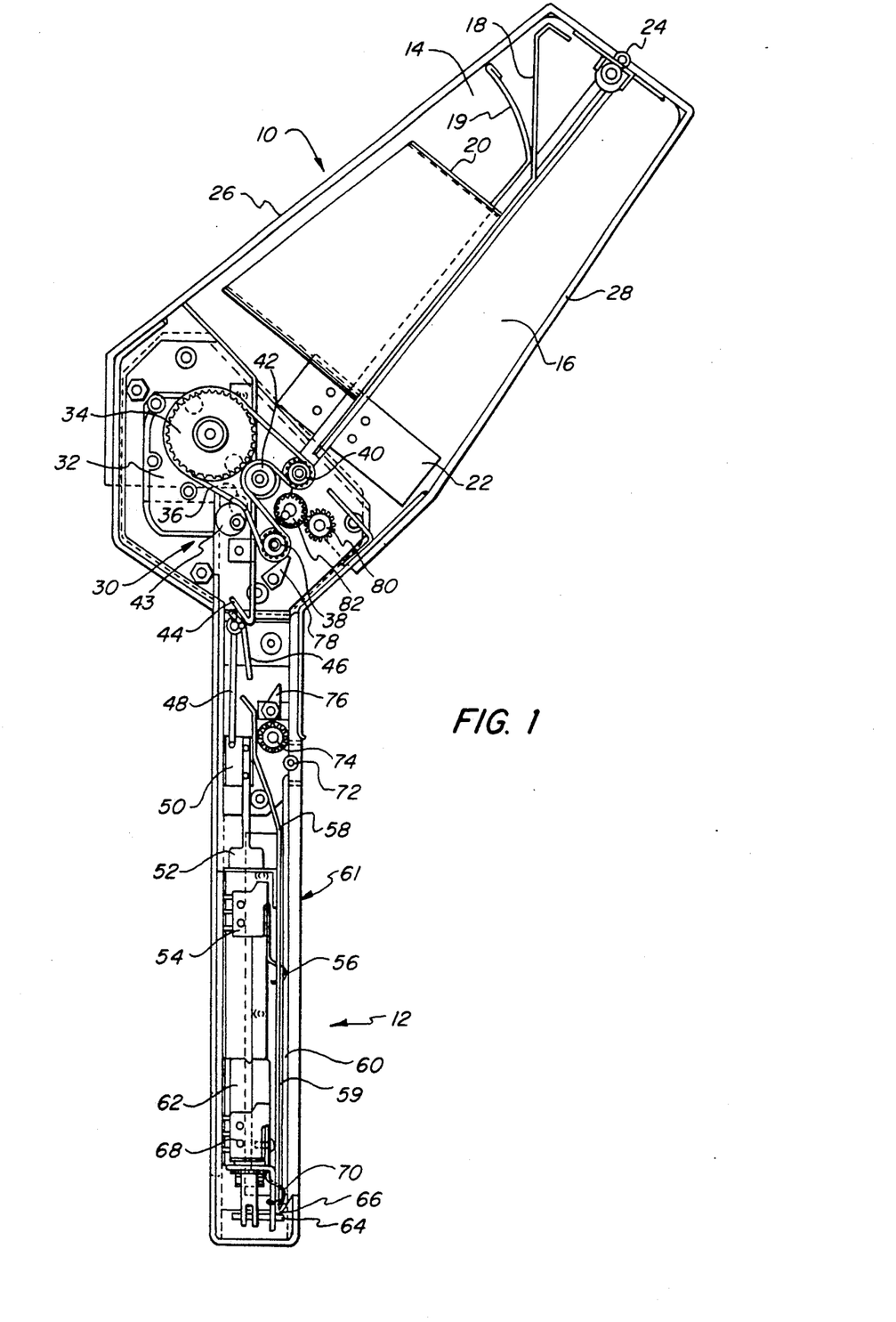
FIG. 1 is a right side cross section of apparatus in accordance with the present invention.
Figure 2:
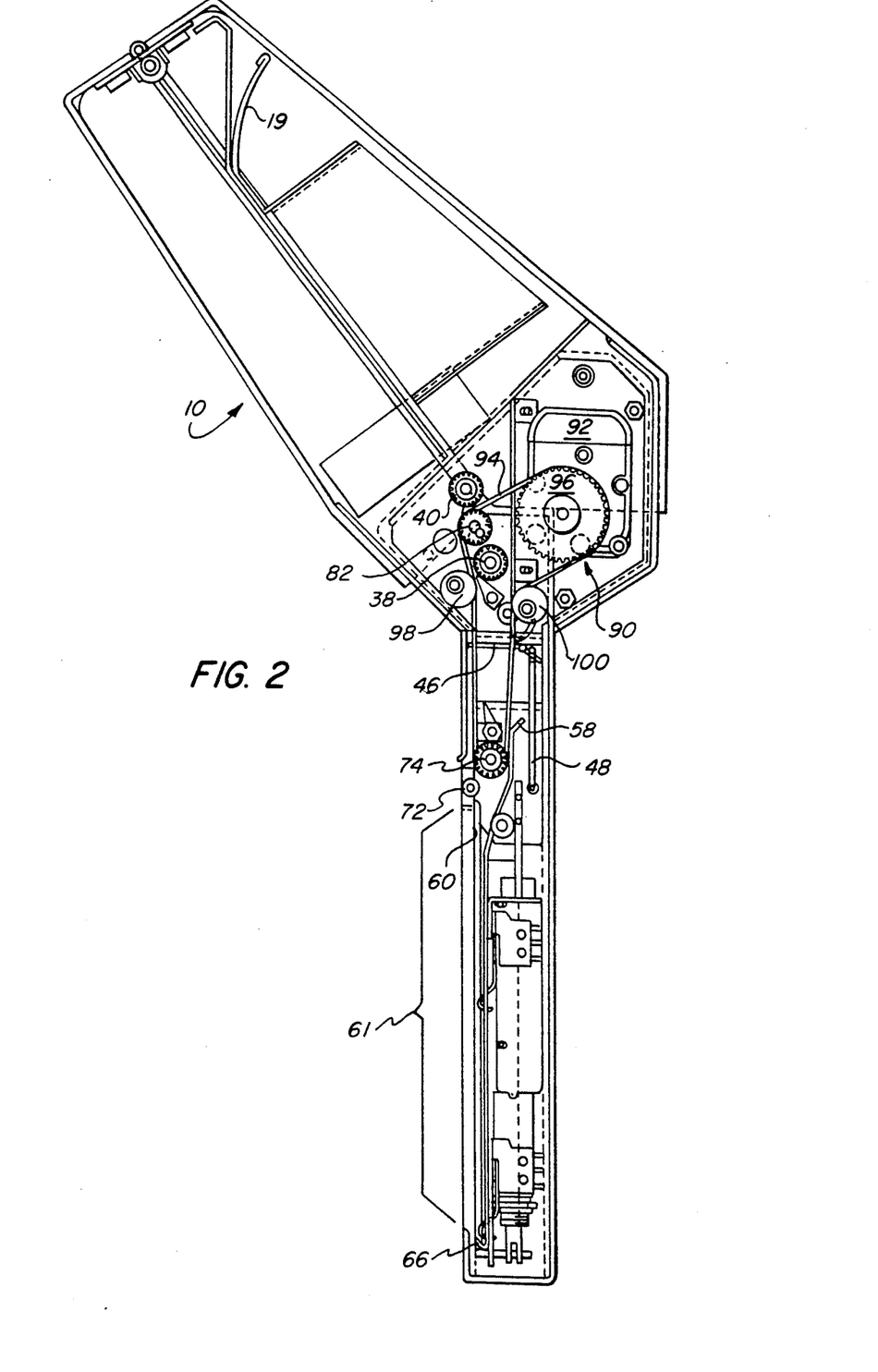
FIG. 2 is a left side cross section of the apparatus of FIG. 1.
Figure 3:
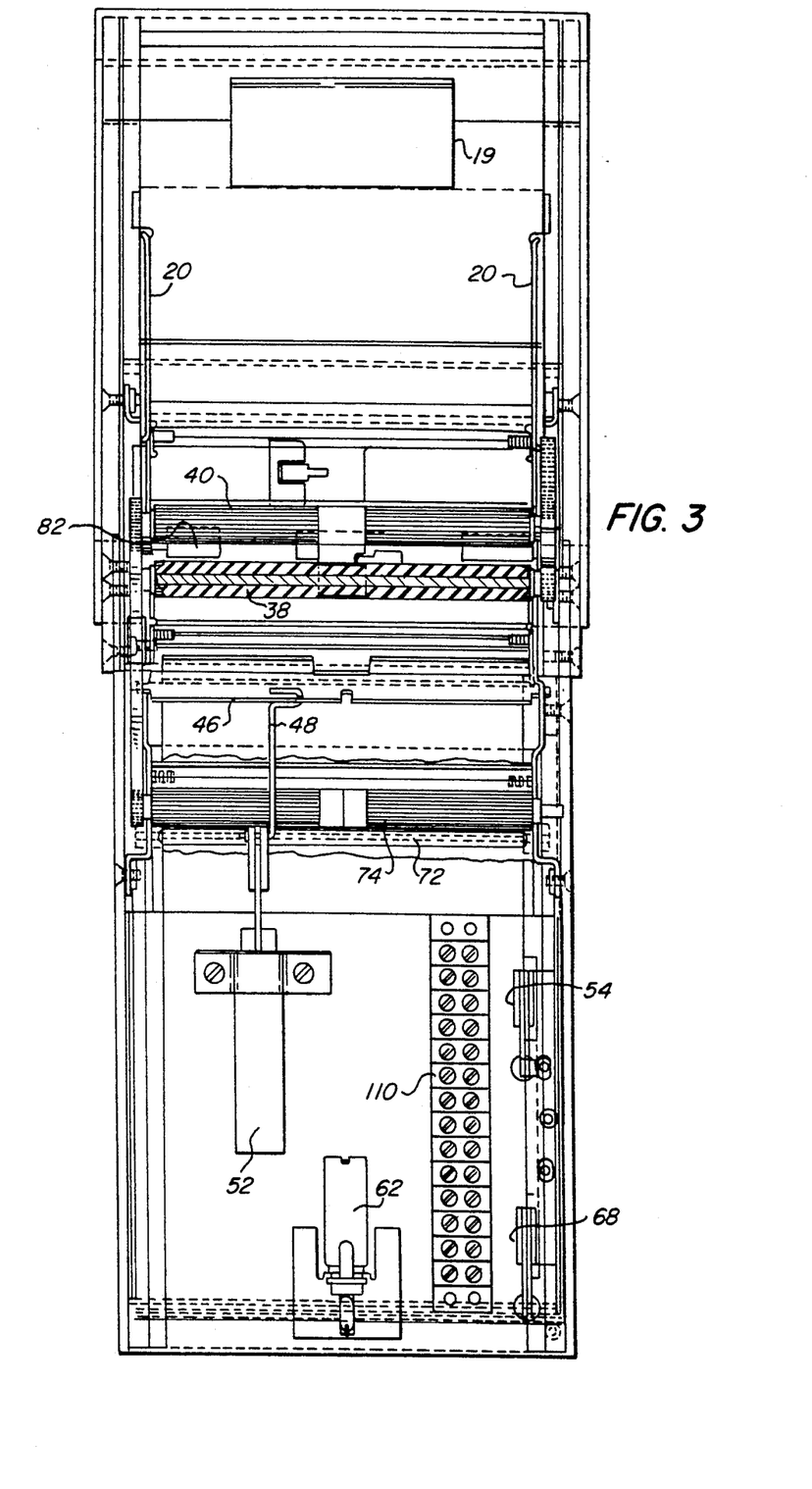
FIG. 3 is a top view of the apparatus of FIG. 2 with the top covers removed to illustrate the drive roller and solenoid assemblies.

FIGS. 1-3 illustrate a right side view, left side view, and top view of the apparatus in detail. A clamshell film supply and storage chamber generally designated 10 includes a top cover 26 and a bottom cover 28 which are connected by a hinge 24. A conventional latch 22 enables the top and bottom covers to be separated by rotating them away from each other around the axis of hinge 24. When the covers are closed and latched by latch 22, the film stored in supply chamber 14 and exposed film chamber 16 is maintained in a light tight environment.

Supply chamber 14 holds a stack of film 112 (FIG. 4) between sheet tray sidewalls 20. The back edges of the sheets of film abut a spring loaded element 19 that serves to fan and advance the sheet stack for more reliable feeding from the bottom of the stack by an input roller 40. A spring stop 18 limits the travel of spring 19 and also serves as a light baffle. The individual sheets of film are fed, one at a time, to an imaging station assembly generally designated 12 that holds the film in an exposure window 61 for exposure by a film recorder or the like.

The sheets of film are driven out of the film supply chamber 14 by a first drive means generally designated 30. The first drive means includes a first motor 32 that drives a first drive pulley 34, which in turn drives a belt 36 to effect rotation of input drive rollers 38 and 40. Drive belt 36 wraps around an idler wheel 42 and an eccentric tensioner 43 to maintain proper tension.

After drive roller 40 pulls the bottom sheet of imaging material (e.g., photographic film) from the supply stack, the sheet will progress to input drive roller 38. Roller 38 continues to drive the sheet via input sheet guide 44 past a light trap 46 and fixed guide 76, into a path defined by sheet path guide 58. For purposes of illustration, light trap 46 is shown in its open position in FIGS. 1 and 4 and in its closed position in FIGS. 2 and 3. When open, the light trap allows sheets to pass. When closed, the light trap blocks out light that could expose film in the supply and exposed film chambers.

After the sheet enters the path defined by sheet path guide 58, it is passed off from the first drive means to a sheet driving roller 74 of a second drive means generally designated 90, illustrated in FIG. 2. Sheet driving roller 74 forwards the sheet along sheet path guide 58 until the trailing edge of the sheet passes beyond roller 74. At this point, the momentum of the sheet continues to carry the sheet until the leading edge thereof is stopped by an angled edge support ("hook") 66. Hook 66, a pair of edge guide channels 60, edge support roller 72, and a platen surface 59 of sheet path guide 58 cooperate to maintain the sheet in a fixed position within exposure window 61 for exposure by a camera (not shown) to which the imaging station assembly 12 is mounted. Hook 66 also keeps the leading edge of the sheet of film from curling, and edge support roller 72 opposite hook 66 maintains film flatness in conjunction with edge guide channels 60, thereby maintaining a proper focus. The camera projects an image to the film via exposure window 61 for exposure in a conventional manner.

Second drive means 90 includes a second motor 92 that drives a second drive pulley 96. Pulley 96 carries a drive belt 94 that is used to rotate output drive roller 82 and sheet driving roller 74. Eccentric tensioners 98, 100 maintain a proper tension on the drive belt 94.

As a sheet of imaging material progresses into the imaging station along sheet path guide 58, it will actuate arm 56 of a sheet path sensor 54. Although the sheet path sensor is illustrated as a mechanical switch in the drawings, it should be appreciated that other types of sensors can be substituted for this and other switches shown in the illustrated embodiment. For example, optoelectronic sensors can be utilized as well known in the art, although this may not be preferred since the radiation emitted by an optical emitter can expose infrared photographic film. Similarly, when the leading edge of a sheet has progressed all the way into hook 66, a load limit sensor 68 will be actuated via actuator arm 70. The signals from sensors 54 and 68 are input to a control processor 120, illustrated in FIG. 6, for controlling the drive motors and other functions of the automatic sheet loading and retrieval apparatus.

When sensor 54 detects the presence of a sheet in the imaging area during a loading operation, it will signal control processor 120 to turn off first drive motor 32. At this point in time, the next sheet from stack 112 will have been staged to roller 38 so that it is immediately available for the next load operation. Since input drive rollers 38 and 40 are driven by drive motor 32, which has been turned off, the next sheet will not advance into the imaging station. However, the current sheet, which triggered actuator arm 56, will continue to be driven by sheet driving roller 74, which is part of the second drive means 90. This sheet will continue all the way until it is past sheet driving roller 74 and its leading edge is in hook 66, as detected by actuator arm 70 of load limit sensor 68. When load limit sensor 68 detects the presence of the leading edge of a sheet of film, it will signal control processor 120 to turn off second drive motor 92, which stops rollers 74 and 82.

After the sheet of film has been exposed, the controller 120 (FIG. 6) initiates a retrieval cycle by actuating ejection solenoid 62, which pulls an ejector finger 64 (FIG. 1) upwardly in the direction of roller 74, thereby kicking the sheet of film upwards so that sheet driving roller 74 catches the sheet and drives it on toward a fixed output deflector 78. The sheet continues toward output drive rollers 80, 82 which advance the sheet into the exposed film chamber 16.

Prior to the time that controller 120 actuates ejection solenoid and second motor 92 in order to retrieve the sheet from the imaging station and forward it to the exposed film chamber, the controller actuates light trap solenoid 52 which, via coupler 50 and actuator arm 48, opens the light trap 46. This enables the sheet to advance from the imaging station 12 into the exposed film chamber 16. The purpose of light trap 46 is to shield the supply chamber 14 and exposed film chamber 16 from light when the imaging station 12 is removed from the image recorder. After the sheet of film has been safely forwarded back to the exposed film chamber, control circuit 120 will turn off the second drive motor 92 as well as the light trap solenoid 52, placing the apparatus back into a standby condition.

Figures 4, 5:
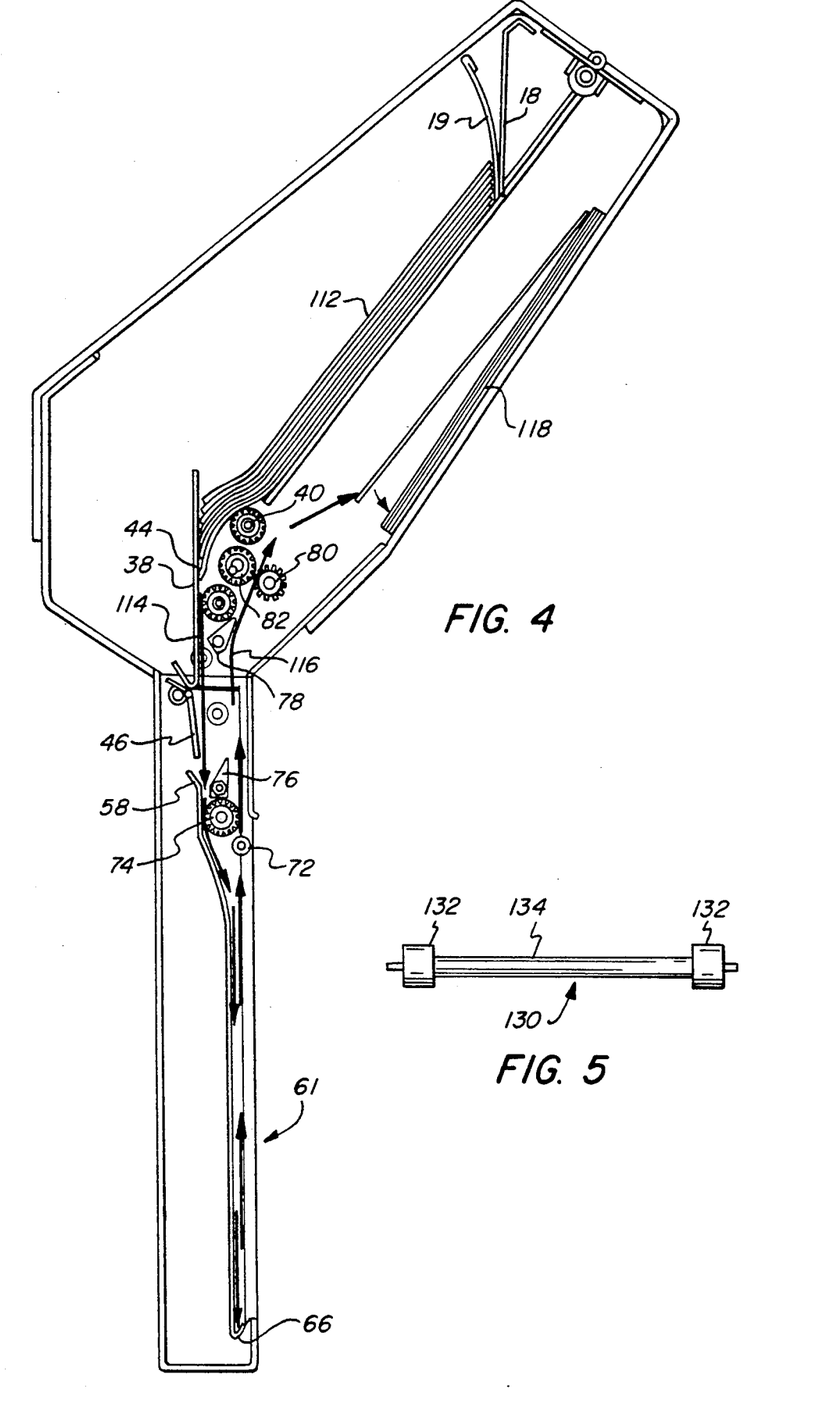
FIG. 4 is a simplified right side view of the apparatus illustrating the path that sheets of imaging material take as they are loaded into and retrieved from the imaging station.
FIG. 5 is a preferred profile of a drive roller embodiment for use in accordance with the present invention.

When it is desired to load a new sheet of film into the imaging station, the controller 120 initiates a load cycle. During the load cycle, the controller actuates the light trap solenoid 52 to open the light trap, and then turns on the first drive motor 32 and the second drive motor 92. Referring to FIG. 4, the bottom sheet from stack 112 will be advanced by input drive roller 40 to input drive roller 38 in the direction designated by arrows 114. The sheet will then advance as guided by input sheet guide 44 past the open light trap 46 and fixed input deflector 76 into the sheet path along sheet path guide 58. Sheet driving roller 74 will continue to advance the sheet into the imaging station, where its leading edge will be caught by hook 66. Subsequent retrieval of the sheet will proceed in the direction of arrows 116 for placement of the sheet in the stack of exposed film 118.

FIG. 5 illustrates an alternate, preferred embodiment for the input drive rollers 38, 40, sheet driving roller 74 and output drive rollers 80, 82. The rollers, generally designated 130 in FIG. 5, comprise outer edges 132 that are used to drive the sheets of film. The inner roller diameter 134 is smaller than the diameter of edges 132. As a result, there will be no contact with the sheets of film except at their edge portions, thereby reducing the possibility that the film will be scratched or otherwise damaged during transit. Those skilled in the art will appreciate that rollers 130 can be designed with edges 132 having a tapered profile instead of the abrupt profile illustrated.

Figure 6:
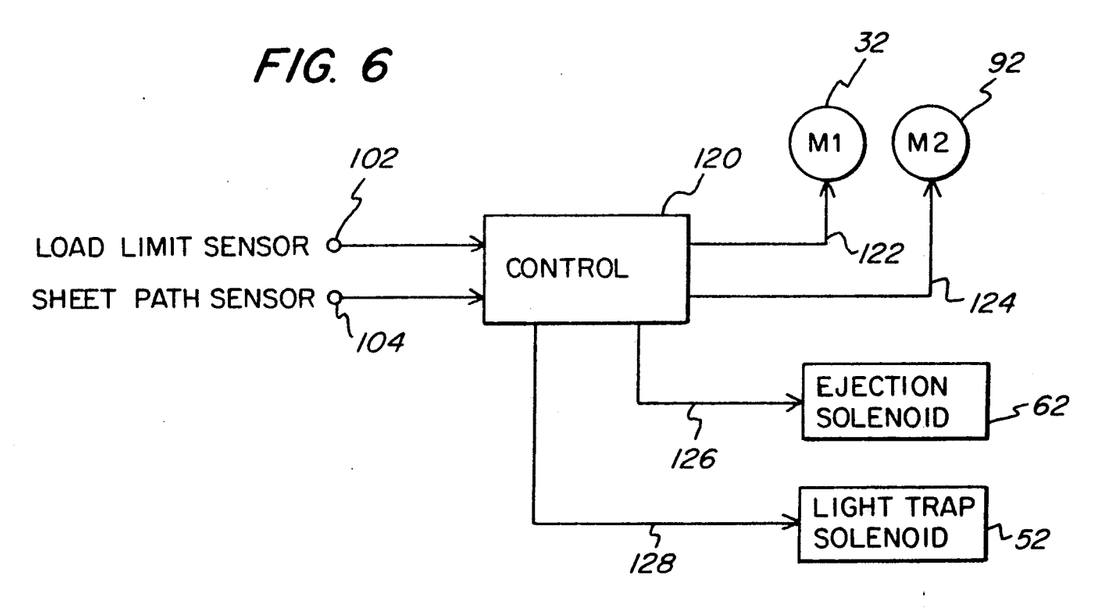
FIG. 6 is a block diagram of a control system for use with the apparatus of the present invention.

As noted above, FIG. 6 illustrates a control system for the automatic sheet feeder of the present invention. Control circuit 120 can comprise a simple microprocessor or the like which controls the various drive motors and solenoids in response to various input signals coupled thereto via a signal distribution module (e.g., a printed circuit board or a terminal strip 110 as illustrated in FIG. 3). In particular, control circuit 120 monitors the state of load limit sensor 68 via terminal 102, as shown in FIG. 6. When the load limit sensor is actuated, control circuit 120 will know that a sheet of film has advanced all of the way into the imaging station. The actuation of this sensor will signal controller 120 to turn off motor 92 during the load cycle.

Sheet path sensor 54 is monitored via input terminal 104. The response to this sensor will depend on when the sensor is actuated. If it is actuated during a load cycle, controller 120 will know that the sheet has now progressed into the imaging station, and will turn off first drive motor 32. During a sheet retrieval cycle, controller 120 will monitor the state of sheet path sensor 54 to verify that the sheet is on its way out of the imaging station. Sensor 54 can also be used to indicate a jam condition to controller 120.

Controller 120 can be provided as part of an image recorder or other imaging device that is used with the apparatus of the present invention. The controller will enable the imaging device to expose the film when load limit sensor 68 is actuated, indicating that a sheet of film is fully situated within exposure window 61. After exposing the film, the controller will automatically actuate the light trap solenoid, ejection solenoid and second drive motor to retrieve the exposed film. When the imaging device is ready to expose another sheet of film, it will automatically actuate the light trap solenoid, first drive means and second drive means to load a new sheet. The controller is electrically coupled to the sheet feeding/retrieval apparatus via a cable which includes line 122 to first drive motor 32, line 124 to second drive motor 92, line 126 to ejection solenoid 62 and line 128 to light trap solenoid 52.

Figure 7:
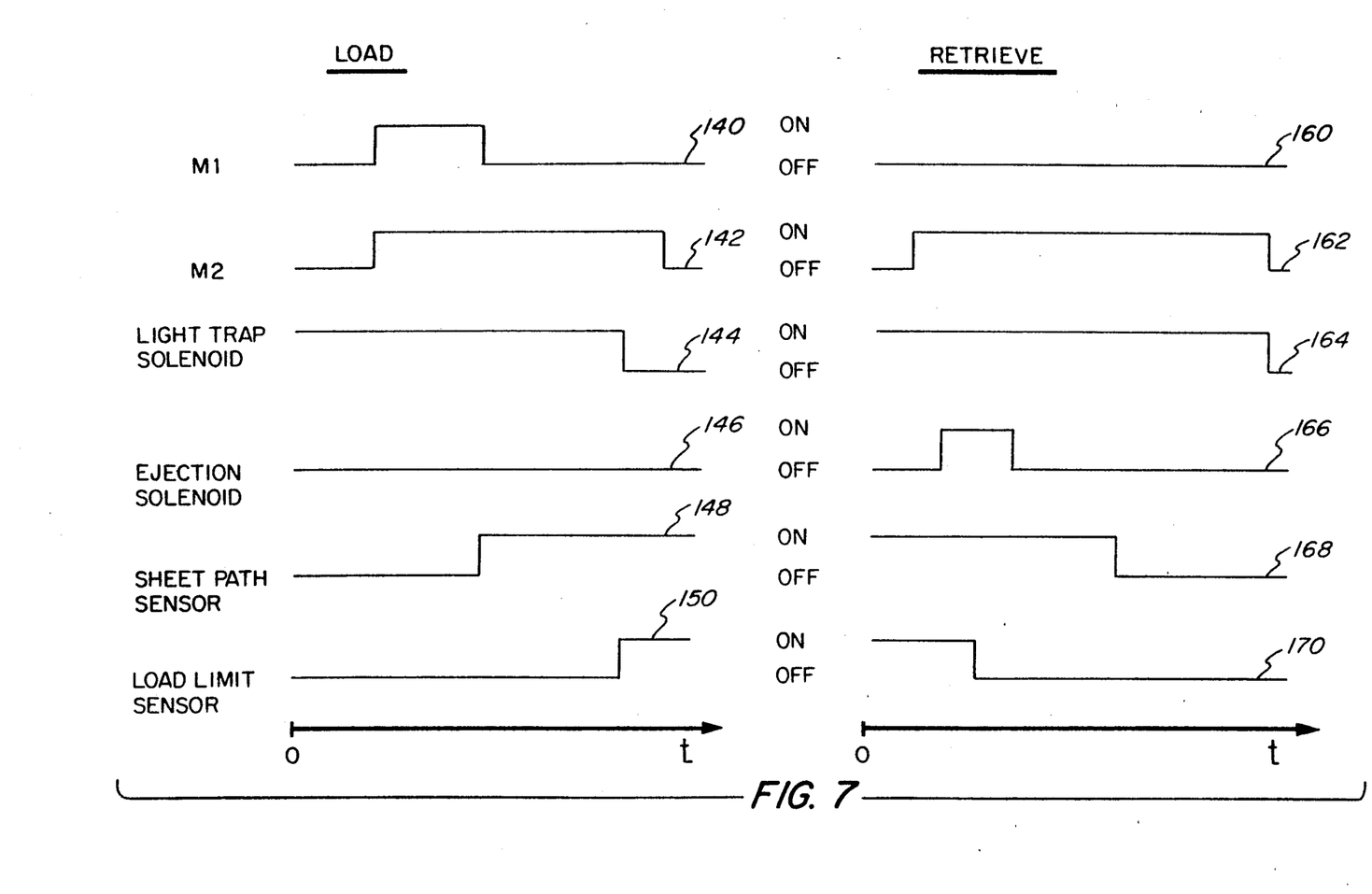
FIG. 7 is a timing diagram of controller functions during sheet load and retrieval cycles.

FIG. 7 illustrates the timing of the control functions provided by controller 120. During a load cycle, first motor 32 (M1) and second motor 92 (M2) are both turned on simultaneously, as indicated by 140, 142, respectively. Prior to turning on either of the motors, light trap 46 is opened by actuating solenoid 52, as illustrated at 144. First motor 32 is turned off as soon as sheet path sensor 54 detects the leading edge of a sheet of film, as indicated at 140, 148, respectively. When the sheet of film is fully loaded into the imaging station, as detected by load limit sensor 68, the second drive motor 92 is turned off, as illustrated at 142, 150. During the load cycle, the ejection solenoid is not turned on, as illustrated at 146.

During the retrieve cycle, the first drive motor 32 is not turned on at all, as indicated at 160. Initially, both sheet path sensor 54 and load limit sensor 68 will be on, because a sheet of film will be present in the imaging station. This is indicated at 168, 170. At the beginning of the retrieve cycle, the light trap 46 will be opened by actuating solenoid 52, as illustrated at 164. Shortly thereafter, the second drive motor 92 (M2) will be turned on, as illustrated at 162. Then, the ejection solenoid will be actuated to kick the sheet of film up to sheet drive roller 74 as illustrated at 166. As illustrated at 170 and 168, the load limit and sheet path sensors will advise the controller when they are no longer being actuated by the presence of a sheet. When the second drive motor has advanced the sheet all of the way into the exposed film chamber, the second drive motor will be turned off and the light trap will be closed, as illustrated at 162, 164.

It should now be appreciated that the present invention provides an improved automatic film loading and unloading apparatus for use with a film recorder or the like. The load and retrieve cycles are independent. This enables a sheet to be retrieved from an imaging station without loading a subsequent sheet into the imaging station at the same time. A mechanical light trap opens a path between the film supply and imaging station only when necessary to transport the film.

Although the invention has been described in connection with a specific embodiment thereof, those skilled in the art will appreciate that numerous adaptations and modifications may be made thereto without departing from the spirit and scope of the invention as set forth in the claims.

We claim:

1. Apparatus for automatically loading and unloading sheets of imaging material to and from an imaging station comprising:
    supply means for holding a stack of sheets of imaging material;
    receiving means for holding a stack of said sheets after imaging;
    first drive means for driving a sheet of imaging material from said supply means toward said imaging station during a sheet loading cycle;
    second drive means independent of said first drive means for driving said sheet of imaging material into said imaging station during said sheet loading cycle and for subsequently retrieving said sheet from said imaging station and driving the retrieved sheet into said receiving means during a sheet retrieval cycle, said second drive means including a sheet driving member to which said first drive means passes off said sheet during said sheet loading cycle and an output drive member for driving said sheet into said receiving means during said sheet retrieval cycle;
    ejection means for ejecting said sheet from said imaging station to said sheet driving roller for retrieval; and
    control means for selectively:
    (i) actuating said first and second drive means to load said sheet into said imaging station, or
    (ii) actuating said ejection means and second drive means to retrieve said sheet from said imaging station and drive said sheet into said receiving means.

2. Apparatus in accordance with claim 1 wherein said imaging material is light sensitive, said apparatus further comprising:
    a normally closed light trap mounted in a path for said sheet between said supply means and said imaging station; and
    means responsive to said control means for opening said light trap to allow said sheet to travel through said path when being loaded into said imaging station.

3. Apparatus in accordance with claim 2 wherein said light trap extends into an output path between said imaging station and said receiving means, and said means responsive to said control means open said light trap to allow said sheet to travel through said output path when being driven into said receiving means.

4. Apparatus in accordance with claim 3 wherein said light trap is open when said second drive means are actuated.

5. Apparatus in accordance with claim 1 wherein said supply means and said receiving means are housed in a clam-shell type housing having a hinged opening to provide access for filling said supply means with said sheets of imaging material and emptying said receiving means.

6. Apparatus in accordance with claim 1 wherein said first drive means comprise:
    at least one input drive roller mounted adjacent to said supply means and driven by a first motor.

7. Apparatus in accordance with claim 6 wherein said sheet driving and output drive members each comprise a roller and said second drive means comprise:
    a second motor for driving said sheet driving roller and said output drive roller.

8. Apparatus in accordance with claim 7 wherein said control means actuate said first drive means by turning on said first motor and actuate said second drive means by turning on said second motor.

9. Apparatus in accordance with claim 7 wherein at least one of said sheet driving roller, said input drive roller and said output drive roller provides sheet driving surfaces at opposite outer edges of the roller with a reduced diameter portion between said outer edges that does not contact the sheets as they are driven.

10. Apparatus in accordance with claim 7 wherein said imaging material is light sensitive, said apparatus further comprising:
    a normally closed light trap mounted in a path for said sheet between said supply means and said imaging station; and
    means responsive to said control means for opening said light trap to allow said sheet to travel through said path when being loaded into said imaging station.

11. Apparatus in accordance with claim 10 wherein said light trap extends into an output path between said imaging station and said receiving means, and said means responsive to said control means open said light trap to allow said sheet to travel through said output path when being driven into said receiving means.

12. Apparatus in accordance with claim 11 wherein said light trap is open when said second drive means are actuated.

13. Apparatus in accordance with claim 11 wherein said supply means and said receiving means are housed in a clam-shell type housing having a hinged opening to provide access for filling said supply means with said sheets of imaging material and emptying said receiving means.

14. Apparatus in accordance with claim 1 wherein said sheet driving member and output drive member each comprise a roller that provides sheet driving surfaces at opposite outer edges of the roller with a reduced diameter portion between said outer edges that does not contact the sheets as they are driven.

15. Apparatus in accordance with claim 1 wherein said sheets comprise photographic film and said imaging station comprises focus maintaining means for holding said film in a flat position for exposure by a camera.

16. Apparatus in accordance with claim 15 wherein said focus maintaining means comprise support members mounted in said imaging station at leading and trailing edges of said film.

17. Apparatus in accordance with claim 16 wherein said support members comprise an edge support roller for supporting one of said leading and trailing edges and an angled edge support for supporting the other of said leading and trailing edges.

18. Apparatus in accordance with claim 1 wherein said control means are responsive to signals from a camera for initiating said sheet loading and sheet retrieval cycles.

19. Apparatus in accordance with claim 18 wherein said camera signals automatically initiate said sheet loading and sheet retrieval cycles without operator intervention.

* * * * *